United States Patent
Chiang et al.

[11] Patent Number: 6,137,669
[45] Date of Patent: Oct. 24, 2000

[54] SENSOR

[76] Inventors: Justin N. Chiang; James Toth; William C. Beadling, all of c/o Raychem Corportion, Intellectual Property Law Dept., MS 120/1A, 300 Constitution Dr., Menlo Park, Calif. 94025-1164

[21] Appl. No.: 09/182,590

[22] Filed: Oct. 28, 1998

[51] Int. Cl.⁷ ........................................ H02H 5/00
[52] U.S. Cl. ........................ 361/103; 361/58; 361/115
[58] Field of Search ................................. 361/103, 104, 361/106, 115, 58, 118, 119, 127

[56] References Cited

U.S. PATENT DOCUMENTS

| | | | |
|---|---|---|---|
| 3,668,373 | 6/1972 | Laing | 219/505 |
| 4,237,441 | 12/1980 | van Konynenburg et al. | 338/22 R |
| 4,545,926 | 10/1985 | Fouts et al. | 252/511 |
| 4,724,417 | 2/1988 | Au et al. | 338/22 R |
| 4,774,024 | 9/1988 | Deep et al. | 252/511 |
| 4,935,156 | 6/1990 | van Konynenburg | 219/553 |
| 5,049,850 | 9/1991 | Evans et al. | 338/22 R |
| 5,158,366 | 10/1992 | Nagai et al. | 374/183 |
| 5,166,658 | 11/1992 | Fang et al. | 338/23 |
| 5,250,228 | 10/1993 | Baigrie et al. | 252/511 |
| 5,378,407 | 1/1995 | Chandler et al. | 252/513 |
| 5,451,919 | 9/1995 | Chu et al. | 338/22 R |
| 5,582,770 | 12/1996 | Chu et al. | 252/511 |
| 5,663,702 | 9/1997 | Shaw, Jr. | 337/183 |
| 5,747,147 | 5/1998 | Wartenberg et al. | 428/209 |
| 5,864,281 | 1/1999 | Zhang et al. | 338/22 R |

FOREIGN PATENT DOCUMENTS

| | | | |
|---|---|---|---|
| 0 064 334 | 11/1982 | European Pat. Off. | G01K 1/02 |
| 10-270094 | 10/1998 | Japan | H01M 10/48 |
| 2880200 | 1/1999 | Japan | G01R 31/36 |
| 2 220 296 | 1/1990 | United Kingdom | H01M 6/50 |

OTHER PUBLICATIONS

European Patent Office International Search Report for International Application No. PCT/US99/25351 dated Feb. 11, 2000.

*Primary Examiner*—Stephen W. Jackson
*Attorney, Agent, or Firm*—Marguerite E. Gerstner

[57] ABSTRACT

A laminar sensor for detecting changes on a laminar substrate. The sensor includes a laminar sheet which has a first surface and a second opposite surface, and is made from a conductive polymer composition which exhibits PTC behavior. A plurality of sensing elements are electrically connected in series on the sensor. Each sensing element is formed as an electrode pair containing a first electrode and a second electrode. The first and second electrodes may be on the same surface of the laminar sheet or on opposite surfaces of the sheet. Two electrical leads are present for connecting the sensing elements into a circuit, which may be used to detect changes in resistance which occur when a sensing element is exposed to an elevated temperature, a change in pressure, or a solvent.

5 Claims, 3 Drawing Sheets

SENSOR

BACKGROUND OF THE INVENTION

1. Field of the Invention

This invention relates to sensors, including temperature sensors.

2. Introduction to the Invention

A wide variety of electronic components and other articles are subject to damage if exposed to elevated temperature. It is, therefore, often important to be able to determine if a component has been subjected to such temperature. Various detection techniques, e.g. thermochromic materials which change color when exposed to a specific temperature, have been proposed for this purpose. Such techniques suffer from the requirement that the article must be visible in order to detect the color change, and thus are ineffective when the article is enclosed. Various electronic detectors, designed to identify an electrical change resulting from a high temperature, have also been proposed. Such detectors may not be able to determine whether a particular part of an article has been exposed to a high temperature, relying instead on the average over the entire surface. In addition, sensors which are able to maintain direct contact with the substrate, even when the substrate is not flat, are desirable. Such sensors would have sufficient flexibility that they could provide two-dimensional sensing over a large surface, and be able to be bent over an edge to provide three-dimensional sensing.

Conductive polymer compositions exhibiting a positive temperature coefficient of resistance (PTC) effect are well known. Such compositions comprise a polymeric component, and dispersed therein, a particulate conductive filler. At low temperatures the composition has a relatively low resistivity. However, when the composition is exposed to a high temperature, due for example, to a high current condition, the resistivity of the composition increases, or "switches", often by several orders of magnitude. The temperature at which this transition from low resistivity to high resistivity occurs is the switching temperature, $T_S$. $T_S$ is defined as the temperature at the intersection point of extensions of the substantially straight portions of a plot of the log of the resistance of an element prepared from the composition as a function of temperature which lie on either side of the portion of the curve showing a sharp change in slope.

The use of a sensor comprising a PTC conductive polymer to detect an overtemperature condition is known. For example, Japanese Patent Application No. 10-95019, filed Apr. 7, 1998 (K. K. Raychem), the disclosure of which is incorporated herein by reference, discloses a elongate temperature sensor which can be used to detect overheating in a battery. Batteries which overheat are subject to damage, and in addition may damage the packaging surrounding them and the components in contact with them. While overheating may be due to external environmental conditions, for secondary, i.e. rechargeable batteries, such overheating may occur as a result of excessive charging. The overheating may result in damage to the internal components of the battery, the generation of gas, and, under extreme conditions, explosion of the battery. For example, for nickel-metal hydride batteries, it is desirable to keep the temperature below 100° C. to avoid the. evolution of hydrogen. It is, therefore, important to identify batteries which have been subject to overheating before damage can occur. In Japanese Patent Application No. 10-95019, a sensor is attached to a plurality of batteries. An elongate tape composed of a PTC conductive polymer comprising spaced-apart sensing components and connecting components is in contact with the individual battery cells. The sensing components are electrically connected in series so that the resistance of the sensor is the sum of the resistances of each individual sensing component. The sensor is positioned so that a sensing component is in contact with the external surface of a battery cell, and preferably each individual battery cell contacts a different sensing component. When the battery cells are in a normal, low temperature condition, the resistance of the sensor is low. If, however, one battery cell heats to a temperature above $T_S$, the resistance of the sensing component in contact with that battery cell increases, thus increasing the total resistance of the sensor and indicating that at least one battery has been subject to overheating.

BRIEF SUMMARY OF THE INVENTION

The approach taken in Japanese Patent Application No. 10-95019 requires that the entire battery cell heat to a temperature sufficient to cause the PTC conductive polymer composition to switch. This means that if there is a relatively small hot spot inside the battery cell, which is sufficient to cause damage to a small region of the battery but is insufficient to heat the entire cell, it will not be detected. Many batteries, such as lithium ion polymer batteries have a layered sheet construction in which an anode and a cathode are separated by a separator, and in addition comprise an electrolyte. In practice, the layered sheet is rolled into a cylinder and positioned inside a can to form a battery cell. A hot spot in the center of the cylinder, due, for example, to inhomogeneities in the anode, cathode, or separator, can cause damage to the electrolyte, which is solvent-based. It is, therefore, desirable to have a sensor which can detect not just the temperature of the entire battery cell, but rather the temperature of individual spots within the battery cell.

In another application, a lithium ion polymer battery, used unrolled in its thin, flat configuration, can be positioned behind the screen of a laptop computer to detect temperature changes. For this application, it is necessary to have an array of sensing elements as a point sensor applied to one part of the screen may not reflect a change elsewhere on the screen.

Detecting individual spots on a substrate is also important for articles other than batteries. It is desirable to have a sensor in which the pattern of the sensing elements can be designed for a specific configuration, so that individual components, e.g. individual elements on a printed circuit board, can be in contact with the sensor. Such a sensor can be used for situations in which the temperature at one spot is not representative of the entire surface, but for which sensing is still required. Furthermore, it is desirable to have a sensor which can be used to detect hot spots over two dimensions and over a large area. We have now found that a laminar sensor comprising a laminar sheet comprising a conductive polymer composition and a plurality of sensing elements has sufficient flexibility to contact substrates of nonuniform or irregular structure, as well as the ability to detect temperature changes over a broad area. In addition, the sensor can be used to detect resistance changes resulting from pressure or exposure to solvents. Thus, in a first aspect this invention provides a laminar sensor for detecting changes, e.g. temperature changes, on a laminar substrate, the sensor having a resistance at 20° C. $R_T$ and comprising (1) a laminar sheet which (a) has a first surface and a second opposite surface, and (b) comprises a conductive polymer composition which (i) exhibits PTC behavior and (ii) has a switching temperature $T_S$;

(2) a plurality of sensing elements (a) which are electrically connected in series, and (b) each of which (i) has a resistance $R_S$ at 20° C.; and (ii) comprises an electrode pair, said electrode pair comprising a first electrode and a second electrode, said electrodes being separated from each other and in contact with the laminar sheet; and (3) two electrical leads for connecting the sensing elements into a circuit.

In a second aspect, the invention provides a lithium ion polymer battery which comprises (A) a laminar battery element surrounded by an insulating material, said battery element comprising (1) first and second battery electrodes, (2) an anode, (3) a separator, (4) a cathode, and (5) and electrolyte; and (B) a laminar temperature sensor of the first aspect of the invention positioned in direct contact with the insulating material and covering at least 75% of one laminar surface of the insulating material.

In a third aspect, the invention provides an electrical circuit which comprises (A) a laminar sensor of the first aspect of the invention; and (B) detection equipment electrically connected to the electrical leads to detect a change in resistance of the sensor.

DETAILED DESCRIPTION OF THE INVENTION

Figure 1:
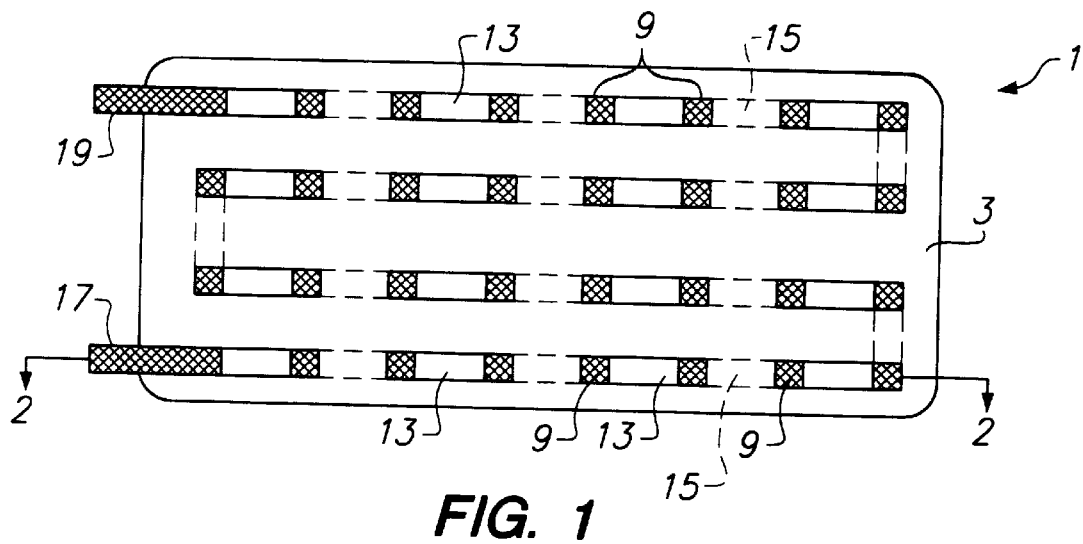
FIG. 1 is a top schematic view of a sensor of the invention.

The sensor of the invention comprises a laminar sheet comprising a conductive polymer composition which exhibits PTC behavior. The conductive polymer composition comprises a polymeric component, and dispersed therein, a particulate conductive filler. The polymeric component comprises one or more polymers, one of which is preferably a crystalline polymer having a crystallinity of at least 10% as measured in its unfilled state by a differential scanning calorimeter. Suitable crystalline polymers include polymers of one or more olefins, particularly polyethylene such as high density polyethylene; copolymers of at least one olefin and at least one monomer copolymerisable therewith such as ethylene/acrylic acid, ethylene/ethyl acrylate, ethylene/vinyl acetate, and ethylene/butyl acrylate copolymers; melt-shapeable fluoropolymers such as polyvinylidene fluoride (PVDF) and ethylene/tetrafluoroethylene copolymers (ETFE, including terpolymers); and blends of two or more such polymers. For some applications it may be desirable to blend one crystalline polymer with another polymer, e.g. an elastomer or an amorphous thermoplastic polymer, in order to achieve specific physical or thermal properties, e.g. flexibility or maximum exposure temperature. The polymeric component generally comprises 40 to 90% by volume, preferably 45 to 80% by volume, especially 50 to 75% by volume of the total volume of the composition.

The particulate conductive filler which is dispersed in the polymeric component may be any suitable material, including carbon black, graphite, metal, metal oxide, conductive coated glass or ceramic beads, particulate conductive polymer, or a combination of these. The filler may be in the form of powder, beads, flakes, fibers, or any other suitable shape. The quantity of conductive filler needed is based on the required resistivity of the composition and the resistivity of the conductive filler itself. For many compositions the conductive filler comprises 10 to 60% by volume, preferably 20 to 55% by volume, especially 25 to 50% by volume of the total volume of the composition.

The conductive polymer composition may comprise additional components, such as antioxidants, inert fillers, non-conductive fillers, radiation crosslinking agents (often referred to as prorads or crosslinking enhancers, e.g. triallyl isocyanurate), stabilizers, dispersing agents, coupling agents, acid scavengers (e.g. $CaCO_3$), or other components. These components generally comprise at most 20% by volume of the total composition.

The composition used in the laminar sheet exhibits positive temperature coefficient (PTC) behavior, i.e. it shows a sharp increase in resistivity with temperature over a relatively small temperature range. In this application, the term "PTC" is used to mean a composition which has an $R_{14}$ value of at least 2.5 and/or an $R_{100}$ value of at least 10, and it is preferred that the composition should have an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. Generally the compositions used in devices of the invention show increases in resistivity which are much greater than those minimum values. It is preferred that these compositions have a PTC anomaly at at least one temperature over the range from 20° C. to ($T_n$+5° C.) of at least $10^1$, preferably at least $10^2$, particularly at least $10^3$, especially at least $10^4$, i.e. the log[resistance at ($T_n$+5° C.)/resistance at 20° C.] is at least 1.0, preferably at least 2.0, particularly at least 3.0, especially at least 4.0, where $T_m$ is the melting temperature of the polymeric component as measured at the peak of the endotherm of a differential scanning calorimeter (DSC) trace. (When there is more than one peak, as for example in a mixture of polymers, $T_m$ is defined as the temperature of the highest temperature peak.)

Suitable conductive polymer compositions are disclosed in U.S. Pat. Nos. 4,237,441 (van Konynenburg et al), 4,545,926 (Fouts et al), 4,724,417 (Au et al), 4,774,024 (Deep et al), 4,935,156 (van Konynenburg et al), 5,049,850 (Evans et al), 5,250,228 (Baigrie et al), 5,378,407 (Chandler et al), 5,451,919 (Chu et al), 5,582,770 (Chu et al), and 5,747,147 (Wartenberg et al), and in copending, commonly assigned U.S. application Ser. No. 08/798,887 (Toth et al, filed Feb. 10, 1997). The disclosure of each of these patents and applications is incorporated herein by reference.

The laminar sheet has a first surface and a second opposite surface. The sheet can be of any thickness, but for many applications in which it is desirable that the sensor be flexible, it is preferred that the sheet be relatively thin, i.e. have a thickness of at most 1.0 mm (0.040 inch), preferably at most 0.76 mm (0.030 inch), particularly at most 0.51 mm (0.020 inch, e.g. 0.08 to 0.25 mm (0.003 to 0.010 inch). The sheet is preferably a solid layer, but it may contain slits or openings in order to accommodate attachment means to the substrate or to enhance the flexibility or fit onto a substrate. The sheet may be crosslinked, e.g. by irradiation or chemical means. The sheet may comprise a single conductive polymer, or different conductive polymer compositions may be used in different sections of the sheet to provide different thermal or electrical capabilities.

A plurality of sensing elements is attached to the laminar sheet. Each sensing element in the preferred embodiment comprises an electrode pair in which a first electrode is attached to the first surface of the sheet and a second electrode is attached to the second surface of the sheet. In this embodiment, a current flow would be through the thickness of the sheet. The electrodes comprise an electrically conductive material, e.g. a metal foil, a conductive ink, or a metal layer which has been applied by plating or other means. The attachment of the electrodes to the surface of the sheet may be either direct, e.g. a metal foil or conductive ink in direct physical contact with the sheet, or indirect, e.g. a metal layer applied via an adhesive or tie layer. In another embodiment, the first and second electrodes can be positioned on the first surface, so that any current flow is parallel to the first surface.

The sensing elements are electrically connected in series. Preferably a first connecting component connects two first electrodes, while a second connecting component connects two second electrodes. In an embodiment in which the first and second electrodes are on opposite surfaces of the sheet, the second connecting component is positioned between, and on the opposite surface of, two first electrodes so that one of the two second electrodes to which it is connected overlaps one of the two first electrodes. In some embodiments, the sensor may comprise a number, i.e. at least two, groups of sensing elements in an array. In the array, each of the sensing elements within each group is connected in series, but each group is not electrically connected to some or all of the other groups. The group may be in the form of a line or any other pattern, and groups may be arranged in the array, e.g. in the form of a grid. Each group comprises at least two sensing elements, but generally there are more. This design is particularly useful when the sensor is intended to have different densities of sensing elements in different sections, e.g. when particular sections of a substrate have a greater tendency to overheat than others and greater precision is desired in some sections. Furthermore, this design allows the sensor to be used in a multiplexing mode. In this process, the resistance of different groups, e.g. lines, of sensing elements is scanned, e.g. line by line in both an x and a y direction, and the resistance values of each scan are compared to a previous scan. A mathematical algorithm can be used to identify a hot spot and its location.

For a sensor in which there is only one line or group of sensing elements it is preferred that the total surface area of the first electrodes is at least 10%, preferably at least 20% of the total surface area of the first surface, and is at most 80%, preferably at most 70%, of the total surface area of the first surface.

Also present are two electrical leads suitable for connecting the sensing elements into a circuit. The circuit may comprise sensing equipment for detecting a resistance change, or it may comprise conventional components, e.g. a power source or load resistance. These leads may be in the form of metal pads on the sheet, similar in material to the electrodes, or they may be wires or other conductive elements.

It is preferred that the first and second electrodes and the first and second connecting components be the same material. Particularly preferred for electrodes and connecting components are electrodeposited metal foils such as nickel, copper, or nickel-copper foils, which may be laminated to the sheet. A conventional photolithographic process can be used to remove metal from some or all of the regions not intended to be electrodes, connecting components, or electrical leads. Some metal may be retained in various sections of the sensor for thermal dissipation or as a reinforcing element. Such metal is not electrically connected to the sensing elements. In an alternative process, the electrodes and connecting components can be applied by screen-printing.

The shape of individual sensing elements may be the same or different on the sensor, although it is preferred that the shape of the first and second electrodes in an individual sensing element be the same. Depending on their shapes, the sensing elements may have the same or different resistance, $R_S$, at 20° C. It is important that the sensing elements be sufficiently large so that the total series resistance at 20° C. of the circuit $R_T$ is low enough that if one sensing element trips and goes into the high resistance state, the total resistance of the sensor will reflect this change with sufficient resolution. The amount of resistance change required to indicate an overheating condition, pressure change, or exposure to solvents is a function of the type of sensing equipment used. It is preferred that when at least one sensing element is exposed to a temperature greater than $T_S$, the resistance of the sensor is at least $1.1R_T$, preferably at least $1.3R_T$, particularly at least $1.5R_T$. Because the sensitivity of the sensor is a function of the number and resistance of the sensing elements, and because larger increases in resistance will mean that the total change in resistance of the sensor when a sensing element trips is larger, compositions with higher PTC anomalies generally are preferred. For example, in a sensor with 100 sensing elements, each with a resistance of 1 ohm, $R_T$ will be 100 ohms. If one sensing element increases in resistance by one decade, i.e. to 10 ohms, the sensor resistance will be 109 ohms, i.e. $1.09R_T$. If the one sensing element increases in resistance by two decades, i.e. to 100 ohms, the sensor resistance will be 199 ohms, i.e. $1.99R_T$. A three decade resistance change in one sensing element, to 1000 ohms, will give a sensor resistance of 1099 ohms, i.e. $11R_T$.

Sensors of the invention can be used to detect temperature changes on any type of substrate, but are particularly useful for detecting changes on a laminar substrate, such as a battery, a hot plate, a heating pad, an electric motor case, or a printed circuit board. Due to its laminar structure and its flexibility, the sensor can be in direct physical contact with the substrate. Although the sensor may cover only a part of the substrate, it is particularly useful when the sensor covers a substantial part of the substrate, i.e. at least 50%, preferably at least 60%, particularly at least 75% of one surface of the substrate.

Although the sensor of the invention is primarily intended to serve as a passive component on a substrate, under certain circumstances, if the resistance of the sensor is sufficiently low, it may be possible to pass current through the sensor and use it both to detect temperature changes and to act as an overcurrent protection device. For this application, the sensor is connected in series in a circuit with a power source and other electrical components which provide a load resistance, and sensing equipment is connected to the sensor in a separate sensing circuit. For this application, it is preferred that the sensing elements be relatively large in size so that the sensor resistance is low. The actual size of the sensing elements will be a function of the maximum circuit resistance which is often dictated by the maximum voltage drop in the system, and the required hold current, i.e. the maximum amount of current the device can pass without tripping, for the circuit.

It is generally preferred that the resistance of the sensor be as low as possible. This is particularly desirable when the sensor is actually part of a circuit and is simultaneously acting as an overcurrent protection device and a temperature sensing device. Under these circumstances, it is important that the resistance of the sensor be low with respect to the circuit to be measured. Thus the resistivity at 20° C. of the composition in the laminar sheet is preferably low, i.e. less than 100 ohm-cm, preferably less than 20 ohm-cm, particularly less than 10 ohm-cm, especially less than 5 ohm-cm.

The sensor of the invention is particularly useful when the substrate is a laminar battery element, in particular a lithium ion polymer battery element. The sensor is sufficiently flexible that it can be rolled into a cylinder, as is commonly done with a lithium ion polymer battery element, and then can detect temperature or other changes which occur at various spots on the battery element and which result in a change in resistance.

In other applications, sensors of the invention can be used to detect changes in pressure, as the resistance of the sensing elements will change with pressure. Sensors of the invention can also be used to detect the presence of solvents if the conductive polymer composition is selected to swell (and thus change resistance) when exposed to a solvent.

Figure 2:
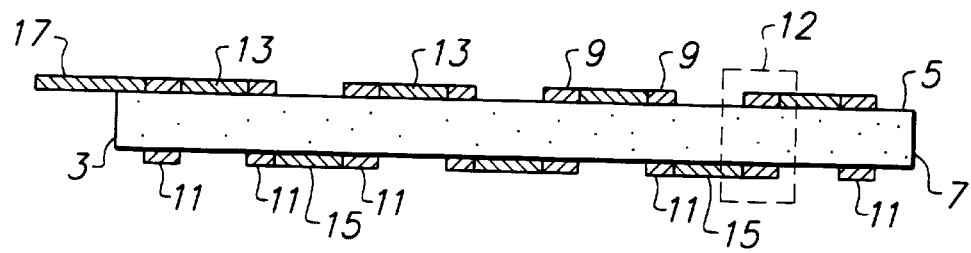
FIG. 2 is a cross-sectional view along line 2—2 of FIG. 1.

The invention is illustrated by the drawings in which FIG. 1 is a top schematic view of a sensor of the invention and FIG. 2 is a cross-sectional view along line 2—2 of FIG. 1. Sensor I has a laminar sheet 3 composed of a conductive polymer composition and having first and second surfaces 5,7. Attached to first surface 5 are first electrodes 9. Two first electrodes 9 are electrically connected by connecting component 13. Attached to second surface 7 are second electrodes 11. Two second electrodes 11 are electrically connected by connecting component 15. Sensing element 12 is composed of an electrode pair of one first electrode 9 and the one second electrode 11 which is opposite it. First and second electrical leads 17,19 are positioned on first surface 5 and provide means for connection to detection electronics or a power source. Because all of the sensing elements are connected in series, only one pair of electrical leads 17,19 is required to measure the resistance of the entire sensor.

Figure 3:
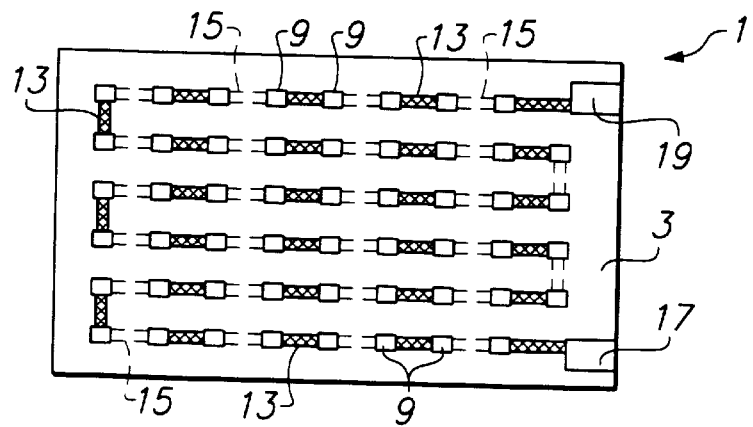
FIGS. 3 and 4 are top schematic views of sensors of the invention.
Figure 4:
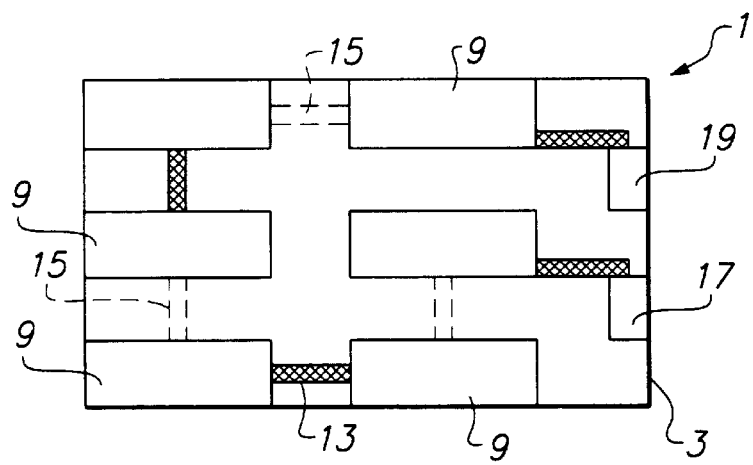

FIGS. 3 and 4 are top schematic views of the sensors described below in Examples 1 and 2, respectively.

Figure 5:
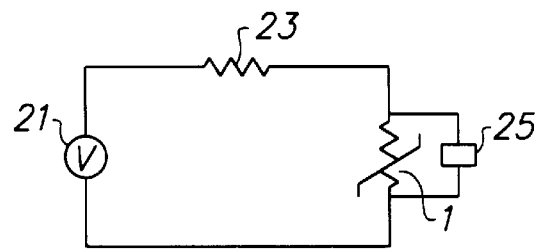
FIG. 5 is an electrical circuit containing a sensor of the invention.

FIG. 5 shows an electrical circuit used in Example 2. In this circuit sensor 1 is electrically in series with power source 21 and load resistor 23. Detection electronics 25, capable of detecting changes in resistance of the sensor, are connected to sensor 1 in a separate sensing circuit.

Figure 6:
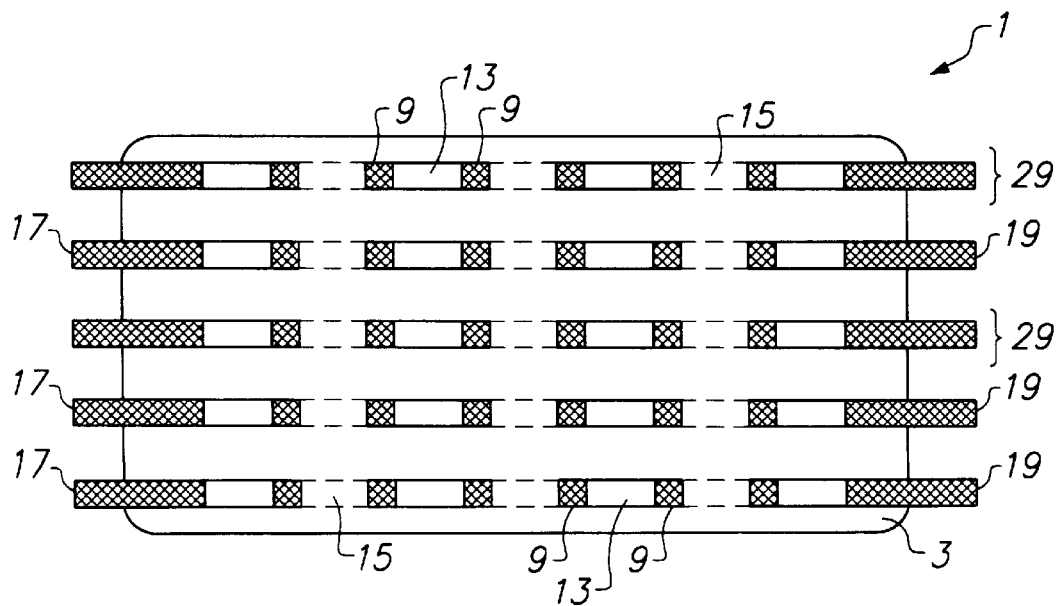
FIGS. 6 and 7 are top schematic views of other sensors of the invention.

FIG. 6 shows a top schematic view of another sensor of the invention, in which multiple sensor lines 29 are present. Each line has first and second electrical leads 17,19, so that individual measurements of that line can be made and some determination of the location of the hot spot or site of the detected change can be made.

Figure 7:
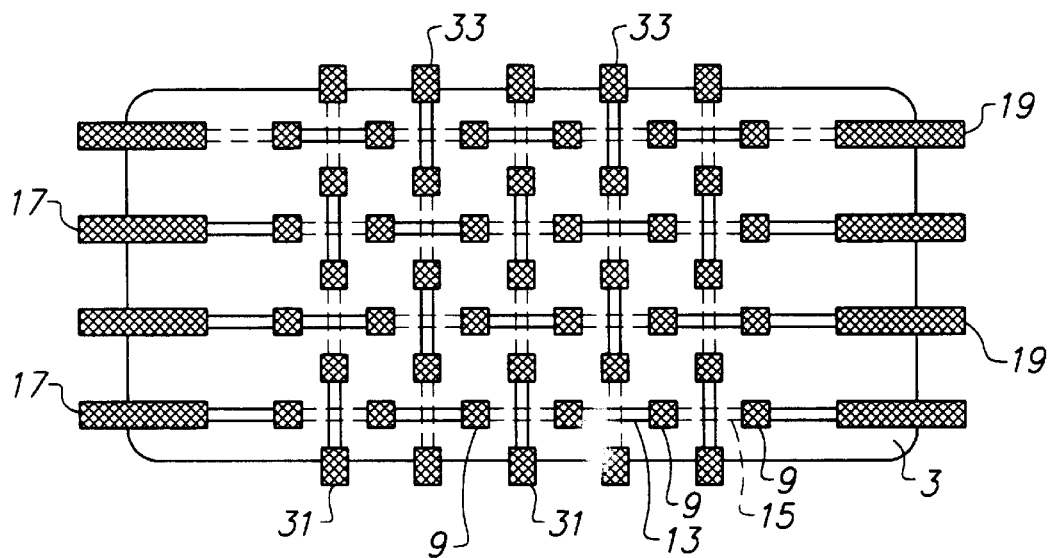

FIG. 7 shows a top schematic view of another sensor of the invention, in which multiple sensor lines are present and the sensing elements are matrixed to provide increased accuracy for determination of the hot spot or site of the detected change. Third and fourth electrical leads 31,33 are present to allow additional resistance measurements to be made, e.g. for a multiplexing application.

Figure 8:
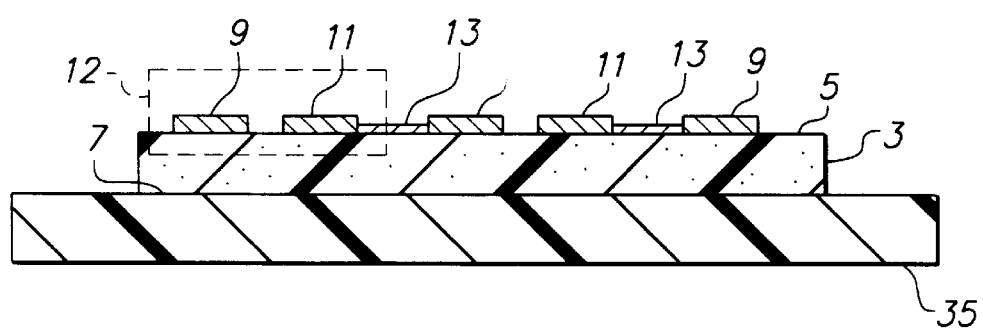
FIG. 8 is a cross-sectional view of another sensor of the invention.

FIG. 8 shows in cross-section a sensor 1 of the invention positioned on substrate 35, e.g. a battery. First and second electrodes 9,11 are attached to the same surface, first surface 5, of laminar sheet 3. Second electrode 11 is electrically connected in series to another first electrode 9 by means of connecting component 13. Sensing element 12 is composed of first electrode 9 and its adjacent second electrode 11, separated by the conductive polymer in laminar sheet 3.

The invention is illustrated by the following examples.

EXAMPLE 1

A conductive polymer composition comprising a mixture of 40% by weight ethylene/n-butyl acrylate copolymer (Enathene™ 705-009, having a melting temperature of about 105° C. and a density of about 0.922 g/cc, available from Quantum Chemical), 10% by weight high density polyethylene (Petrothene™ LB832, having a melting temperature of about 135° C. and a density of about 0.954 g/cc, available from Quantum Chemical), and 50% by weight carbon black (Raven 430, having a density of 1.8, available from Columbian Chemicals) was mixed, formed into a sheet having a thickness of 0.13 mm (0.005 inch), and laminated on either side with electrodeposited nickel-copper foil having a thickness of 0.043 mm (0.0013 inch). The laminate was irradiated to 10 Mrads, and was then subjected to a photolithographic and etching process similar to the type described in U.S. patent application Ser. No. 08/808,135 (Zhang et al, filed Feb. 28, 1997), now U.S. Pat. No. 5,864,281, the disclosure of which is incorporated herein by reference. The laminate was cleaned and photo resists were used to produce masks over the metal foils in the regions which were to be the sensing elements and the electrical connection (i.e. connecting components) regions. The remaining regions of the foils were left exposed and were etched to remove the metal foils in those areas. The masks were then removed. The etched laminate was cut into pieces 51×76 mm (2×3 inches), each having the configuration shown in FIG. 3. For this sensor, fifty-two sensing elements, each about 4 mm (0.18 inch) square and having a resistance of about 0.1 ohm, were evenly distributed and electrically connected in series. The sensing elements covered approximately 28% of each laminar surface of the sensor. Metallized regions at the edge of the element were suitable for use as electrical leads. The resistivity of the composition was about 0.5–1.0 ohm-cm; the switching temperature $T_S$ of the composition as defined above, was about 93° C.

The resistance of the sensor at 20° C. was 4.1 ohms. A heat gun was used as an external heat source and was applied to various numbers of sensing elements. The temperature of the sensor was monitored using a thermal imaging camera, and the maximum temperature, as well as the resistance of the sensor, were recorded. The results are shown in Table I.

TABLE I

| Number of Elements Heated | Maximum Temperature (° C.) | Resistance (ohms) |
| --- | --- | --- |
| 0 | 20 | 4.1 |
| 1 | 70 | 8.0 |
| 2 | 100 | 8.8 |
| ~20 | 85 | 20 |
| ~40 | 100 | 111 |

EXAMPLE 2

Using the procedure and compositions of Example 1, a sensor having the configuration shown in FIG. 4 was prepared. The sensor had dimensions of 51×76 mm (2×3 inches), with six sensing elements, each 10×30 mm (0.4×1.2 inches), connected in series. The sensing elements covered approximately 48% of each laminar surface of the sensor. The resistance of the sensor at 20° C. was 0.042 ohm, each sensor having a resistance of about 0.007 ohm.

The sensor was connected in a circuit (as shown in FIG. 5) in series with a power supply and a load resistor which limited the current passing through the sensor to 5A when a voltage of 18 volts was applied. Under these conditions, the highest temperature detected on the sensor by a thermal imaging camera was 33° C. and the sensor did not trip. A heat gun was used to apply heat to one sensing element, causing the sensing element to increase in resistance and in temperature to at least 95° C. In addition, the thermal derating of the sensor, affected by the increase in temperature of the sensing element, prevented the sensor from continuing to be able to pass 5A and the sensor tripped. The heat gun was removed from the sensing element, leaving the sensor in the tripped state and the sensing element at 95° C. When the power was removed from the sensor, the sensor cooled down and reset.

What is claimed is:

1. A lithium ion polymer battery which comprises
   (A) a laminar battery element surrounded by an insulating material, said battery element comprising (1) first and second battery electrodes, (2) an anode, (3) a separator, (4) a cathode, and (5) and electrolyte; and
   (B) a laminar temperature sensor positioned in direct contact with the insulating material and covering at least 75% of one laminar surface of the insulating material, said sensor having a resistance at 20° C. $R_T$ and comprising
      (1) a laminar sheet which (a) has a first surface and a second opposite surface, and (b) comprises a conductive polymer composition which exhibits PTC behavior;
      (2) a plurality of sensing elements (a) which are electrically connected in series, and (b) each of which comprises an electrode pair, said electrode pair comprising a first electrode and a second electrode, said electrodes being separated from each other and in contact with the laminar sheet; and
      (3) two electrical leads for connecting the sensing elements into a circuit.

2. A battery according to claim 1 wherein the first electrode is attached to the first surface and the second electrode is attached to the second surface.

3. An electrical circuit which comprises
   (A) a laminar sensor for detecting changes on a laminar substrate, the sensor having a resistance at 20° C. $R_T$ and comprising
      (1) a laminar sheet which (a) has a first surface and a second opposite surface, and (b) comprises a conductive polymer composition which (i) exhibits PTC behavior and (ii) has a switching temperature $T_S$;
      (2) a plurality of sensing elements (a) which are electrically connected in series, and (b) each of which comprises an electrode pair, said electrode pair comprising a first electrode and a second electrode, said electrodes being separated from each other and in contact with the laminar sheet; and
      (3) two electrical leads for connecting the sensing elements into the circuit; and
   (B) sensing equipment electrically connected to the electrical leads to detect a change in resistance of the sensor.

4. A circuit according to claim 3 which further comprises
   (C) a source of electrical power which is electrically connected to the sensor,
wherein the sensor acts both to detect changes in temperature and as an overcurrent protection device.

5. A circuit according to claim 4 wherein
   (1) the sensor comprises an array comprising at least two groups of sensing elements, and
   (2) the sensing equipment monitors the groups of sensing elements in the array to allow location of a hot spot.

* * * * *